June 30, 1925.

A. I. G. DU REES 1,543,702

CROSS CHAIN CONNECTER FOR ANTISKID CHAINS

Filed Dec. 8, 1924

Inventor,
Alexander I. G. Du Rees,
By

Patented June 30, 1925.

1,543,702

UNITED STATES PATENT OFFICE.

ALEXANDER I. G. DU REES, OF WINNETKA, ILLINOIS.

CROSS-CHAIN CONNECTER FOR ANTISKID CHAINS.

Application filed December 8, 1924. Serial No. 754,513.

*To all whom it may concern:*

Be it known that I, ALEXANDER I. G. DU REES, a citizen of the United States, residing at Winnetka, in the county of Cook and State of Illinois, have invented certain new and useful Improvements in Cross-Chain Connecters for Antiskid Chains, of which the following is a specification.

This invention relates to improvements in connecters for use in connecting the cross chains of an anti-skid chain with the side chains or links, and one of the objects of the invention is to provide an improved, simple and efficient device of this character by means of the use of which cross chains may be readily secured in position and as readily removed or disconnected from the side chain links when desired.

A further object is to provide an improved device of this character which will securely hold the cross chains and will prevent the broken pieces of chain from being thrown out by the wheel or dropped upon the road bed.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which—

Figure 1:
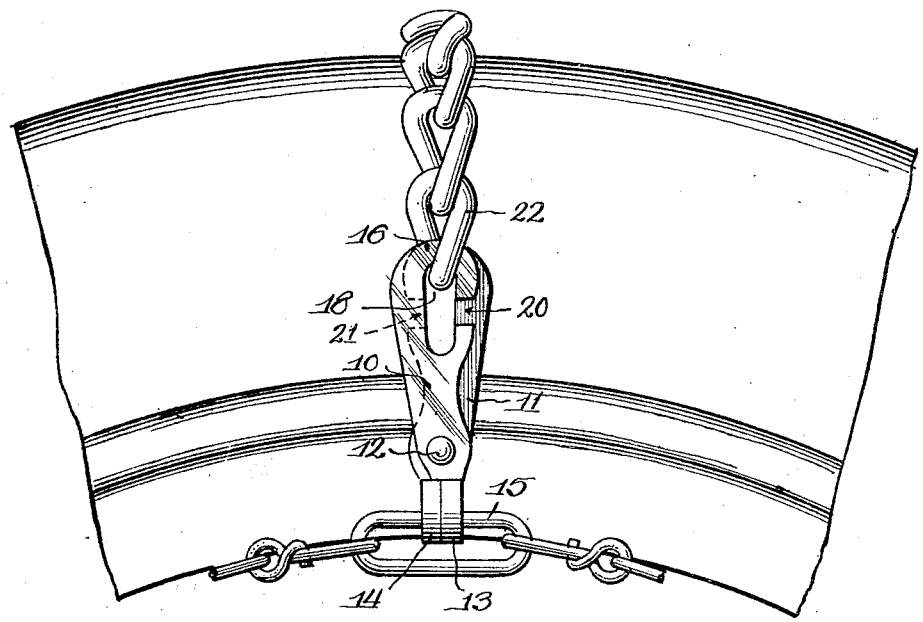
Figure 1 is a view of a portion of an antiskid chain showing the same applied to a portion of a wheel and tire and having a connecting device, constructed in accordance with the principles of this invention, applied thereto.
Figure 2:
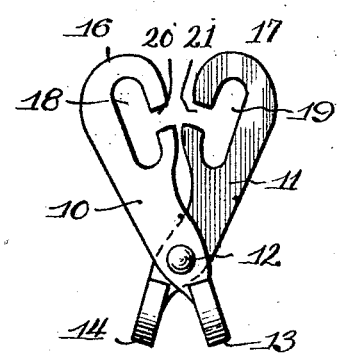
Figure 2 is a view in elevation of one form of attaching device, showing the parts in an open position.

Referring more particularly to the drawing and to the form of the invention shown in Figures 1 and 2, the attaching device consists of two members 10 and 11, pivotally connected intermediate their ends as at 12 so that one of the members will cross the other member. The respective extremities 13—14 of the members 10 and 11 are shaped to form eyes and through which eyes an elongated link 15 of the side chain loosely passes.

The other extremities 16—17 respectively of the members 10 and 11 are provided with elongated slots 18—19 disposed entirely within the confines of the side edges of the members and these slots are respectively provided with entrance openings 20—21 disposed intermediate the ends of the respective slots and opening through the adjacent sides of the members 10 and 11. These slots with their entrance openings form opposed hook shaped portions which are adapted to engage a link 22 of the cross chain and form opposite sides of the link. When the members 10 and 11 are swung about their pivots so that the ends 16 and 17 will overlap, the respective entrance openings 20—21 will be closed by the body portion of the other member and the closing movements of the members 10 and 11 will be limited by the ends of the eyes 13 and 14 abutting each other.

Figure 3:
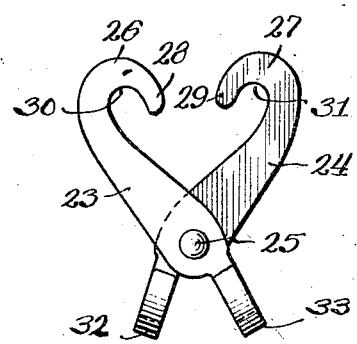
Figure 3 is a view similar to Figure 2 of another form of attaching device.

In the form of the invention shown in Figure 3, the members 23—24 are pivotally connected intermediate their ends as at 25 and the respective extremities 26—27 are shaped to form opposed hook shaped portions 28—29 forming seats 30—31, in which the link 22 rests when the members 23—24 are brought into a position to overlap.

The extremities 32 and 33 of the members 23 and 24 are shaped to form eyes similar to the eyes 13 and 14, and the overlapping movement of the members 23 and 24 will be limited by the abutment of the eyes 32 and 33.

With this invention it will be manifest that the cross chains will be securely locked to the side chains and the broken pieces of chain will be held against being thrown outwardly by the wheel and will also be prevented from dropping upon the road bed.

While the preferred forms of the invention have been herein shown and described it is to be understood that various changes may be made in the details of construction and in the combination and arrangement of the several parts, within the scope of the claim, without departing from the spirit of this invention.

What is claimed as new is:—

A device of the character described including cooperating flat members pivotally connected together intermediate their ends, and in proximity to one extremity of the members, the entire proximate faces of the members on one side of the pivot being adapted to rest flat against each other, the extremity of each of the members on the other side of the pivot being shaped to form an eye, adapted to receive a link through the said eyes, the other extremity of each of the said members being provided with elongated slots within the confines of the sides of the respective members, said slots having restricted entrance openings extending through the proximate edges of the said members, the said entrance openings being disposed intermediate and spaced from both of the ends of the respective slots, the slotted extremities of said members being adapted to overlap when the other ends of the said members are brought together, whereby the slots will be brought into register, and the entrance openings of the slots will be respectively closed by the body portion of the other of the said members, each of the members being maintained entirely on one side of the other member.

In testimony whereof I have signed my name to this specification, on this 4th day of December, A. D. 1924.

ALEXANDER I. G. DU REES.